US009000911B2

(12) United States Patent
Kummetz (10) Patent No.: US 9,000,911 B2
(45) Date of Patent: *Apr. 7, 2015

(54) SYSTEM AND METHOD FOR LOCATION OF MOBILE DEVICES IN CONFINED ENVIRONMENTS (71) Applicant: Andrew LLC, Hickory, NC (US)

(72) Inventor: Thomas Kummetz, Kissing (DE)

(73) Assignee: Andrew LLC, Hickory, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/165,000

(22) Filed: Jan. 27, 2014

(65) Prior Publication Data

US 2014/0141801 A1 May 22, 2014

Related U.S. Application Data (63) Continuation of application No. 13/846,352, filed on Mar. 18, 2013, now Pat. No. 8,638,214, which is a continuation of application No. 12/714,602, filed on Mar. 1, 2010, now Pat. No. 8,400,292.

(51) Int. Cl.
| G08B 23/00 | (2006.01) |
| G01S 5/06 | (2006.01) |
| G01S 5/02 | (2010.01) |
| G01S 19/48 | (2010.01) |
| H04W 24/00 | (2009.01) |

(52) U.S. Cl.
CPC ............... *G01S 5/06* (2013.01); *G01S 5/0289* (2013.01); *G01S 19/48* (2013.01); *H04W 24/00* (2013.01)

(58) Field of Classification Search
USPC .................. 340/517, 539.13, 539.11, 539.23, 340/573.3; 455/456.1
See application file for complete search history.

(56) References Cited

U.S. PATENT DOCUMENTS

| 6,184,829 B1 | 2/2001 | Stilp |
| 6,249,252 B1 | 6/2001 | Dupray |

(Continued)

FOREIGN PATENT DOCUMENTS

| WO | 2008063443 A2 | 5/2008 |
| WO | 2008085439 A1 | 7/2008 |

(Continued)

OTHER PUBLICATIONS

Six-page Partial International Search Report mailed Jun. 8, 2011 for PCT/US2011/026050.

(Continued)

*Primary Examiner* — Phung Nguyen
(74) *Attorney, Agent, or Firm* — Wood, Herron & Evans, LLP (57) ABSTRACT A distributed antenna system includes a master unit and a plurality of remote units in communication with the master unit. A plurality of sensors are associated with the respective remote units and the sensors include receiver circuitry configured for capturing RF signals from mobile devices and a controller. The sensors are configured for using the RF signals from at least one mobile device captured by the receiver circuitry and determining position information for the at least one mobile device in the distributed antenna system. The receiver circuitry of the sensor includes an RF receiver integrated with a respective remote unit that is operable to receive RF signals from mobile devices for providing RF communications in the distributed antenna system.

18 Claims, 6 Drawing Sheets

(56) References Cited

U.S. PATENT DOCUMENTS

| | | | |
|---|---|---|---|
| 6,674,403 B2 * | 1/2004 | Gray et al. ............... 342/463 |
| 6,873,852 B2 | 3/2005 | Koorapaty et al. |
| 6,952,181 B2 | 10/2005 | Karr et al. |
| 6,961,367 B2 | 11/2005 | Simic et al. |
| 6,996,392 B2 | 2/2006 | Anderson et al. |
| 7,194,275 B2 | 3/2007 | Bolin et al. |
| 7,245,925 B2 | 7/2007 | Zellner |
| 7,257,387 B2 | 8/2007 | Laliberte |
| 7,298,327 B2 | 11/2007 | Dupray et al. |
| 7,321,777 B2 | 1/2008 | Billhartz et al. |
| 7,327,258 B2 | 2/2008 | Fast et al. |
| 7,427,952 B2 | 9/2008 | Bull et al. |
| 7,429,936 B2 | 9/2008 | Paradiso et al. |
| 7,440,762 B2 | 10/2008 | Maloney et al. |
| 7,525,425 B2 | 4/2009 | Diem |
| 7,525,484 B2 | 4/2009 | Dupray et al. |
| 7,528,723 B2 | 5/2009 | Fast et al. |
| 7,529,236 B2 | 5/2009 | Kota et al. |
| 7,539,161 B2 | 5/2009 | Bolin et al. |
| 7,546,084 B2 | 6/2009 | Kennedy, Jr. et al. |
| 7,570,615 B2 | 8/2009 | Bolin et al. |
| 7,616,155 B2 | 11/2009 | Bull et al. |
| 7,665,263 B2 | 2/2010 | Yau |
| 7,732,088 B2 | 6/2010 | Somerville et al. |
| 7,738,836 B2 | 6/2010 | Alles et al. |
| 7,837,774 B2 | 11/2010 | Breindel et al. |
| 7,848,733 B2 | 12/2010 | Bull et al. |
| 7,852,262 B2 | 12/2010 | Namineni et al. |
| 7,903,029 B2 | 3/2011 | Dupray |
| 7,920,875 B2 | 4/2011 | Anderson |
| 7,925,205 B2 | 4/2011 | Kennedy, Jr. et al. |
| 7,925,274 B2 | 4/2011 | Anderson et al. |
| 8,010,079 B2 | 8/2011 | Mia et al. |
| 8,032,153 B2 | 10/2011 | Dupray et al. |
| 8,045,917 B2 | 10/2011 | Beck et al. |
| 8,103,285 B2 | 1/2012 | Kalhan |
| 8,121,646 B2 | 2/2012 | Oren et al. |
| 8,144,640 B2 * | 3/2012 | Bims ..................... 370/315 |
| 8,203,910 B2 | 6/2012 | Zhao et al. |
| 8,238,942 B2 * | 8/2012 | Gast ................. 455/457 |
| 8,260,323 B1 * | 9/2012 | Bronner et al. ........... 455/456.6 |
| 8,285,245 B2 | 10/2012 | Ashley, Jr. et al. |
| 8,400,292 B2 | 3/2013 | Kummetz |
| 8,638,214 B2 | 1/2014 | Kummetz |
| 2003/0117281 A1 | 6/2003 | Sriharto et al. |
| 2004/0100930 A1 | 5/2004 | Shapira et al. |
| 2006/0014548 A1 * | 1/2006 | Bolin et al. ............... 455/456.1 |
| 2006/0046664 A1 * | 3/2006 | Paradiso et al. ............... 455/96 |
| 2006/0281913 A1 | 12/2006 | Ferreira et al. |
| 2007/0159388 A1 | 7/2007 | Allison et al. |
| 2007/0229350 A1 | 10/2007 | Scalisi et al. |
| 2008/0085439 A1 | 4/2008 | Hilliard |
| 2008/0085440 A1 | 4/2008 | Yasumoto et al. |
| 2008/0167049 A1 | 7/2008 | Karr et al. |
| 2008/0175175 A1 | 7/2008 | Oren et al. |
| 2008/0186955 A1 | 8/2008 | Puckett |
| 2008/0191941 A1 * | 8/2008 | Saban et al. ............... 342/450 |
| 2008/0198955 A1 | 8/2008 | Oren et al. |
| 2008/0200117 A1 | 8/2008 | Oren et al. |
| 2008/0232305 A1 | 9/2008 | Oren et al. |
| 2008/0284647 A1 | 11/2008 | Oren et al. |
| 2009/0021345 A1 | 1/2009 | Sriharto et al. |
| 2009/0045939 A1 * | 2/2009 | Holland et al. ............... 340/524 |

FOREIGN PATENT DOCUMENTS

| | | |
|---|---|---|
| WO | 2008085440 A2 | 7/2008 |
| WO | 2008085443 A2 | 7/2008 |
| WO | 2008085444 A1 | 7/2008 |
| WO | 2008099390 A2 | 8/2008 |
| WO | 2009081376 A2 | 7/2009 |
| WO | 2011109218 A1 | 9/2011 |

OTHER PUBLICATIONS

Twenty-Page International Search Report mailed Jul. 9, 2011 for PCT/US2011/026050.

* cited by examiner

FIG. 9

SYSTEM AND METHOD FOR LOCATION OF MOBILE DEVICES IN CONFINED ENVIRONMENTS

RELATED APPLICATIONS

This Application is a Continuation Application of U.S. application Ser. No. 13/846,352, filed Mar. 18, 2013, now issued U.S. Pat. No. 8,638,214, issued Jan. 28, 2014, entitled "SYSTEM AND METHOD FOR LOCATION OF MOBILE DEVICES IN CONFINED ENVIRONMENTS"; which application is a continuation application of U.S. application Ser. No. 12/714,602, filed Mar. 1, 2010, entitled "SYSTEM AND METHOD FOR LOCATION OF MOBILE DEVICES IN CONFINED ENVIRONMENTS, now Issued U.S. Pat. No. 8,400,292, issued Mar. 19, 2013, which patents are incorporated herein by reference in their entireties.

FIELD OF THE INVENTION

The present invention is directed to wireless transceiver systems for use in wireless communications, and specifically is directed to determining locations of mobile wireless devices.

BACKGROUND OF THE INVENTION

The use of wireless communication devices such as wireless telephones, pagers, personal digital assistants, laptop computers, etc. has become prevalent in today's society. In some instances individuals have forgone the traditional POTS service and rely totally on their wireless mobile devices. One of the issues with only having a mobile phone is related to emergency phone calls such as 911 in the Unites States and Canada or 112 in the European Union and the difficulty in accurately locating the mobile device used to place the call. This can be especially challenging if the call originated in a multistory building.

Recently, at the urging of public safety groups, there has been increased interest in technology which can determine the geographic position, or "geolocate" a mobile device in certain circumstances. For example, in the United States, the Federal Communication Commission (FCC) has issued a geolocation mandate for providers of wireless telephone communication services that puts in place a schedule and an accuracy standard under which the providers of wireless communications must implement geolocation technology for wireless telephones when used to make a 911 emergency telephone call (FCC 94-102 E911).

In order to support the FCC E911 mandate to locate wireless 911 callers, as well as support other location enabled services, providers of wireless communication services are installing mobile device location capabilities into their networks. In operation, these network overlay location systems generally take measurements on RF transmissions from mobile devices at multiple base station locations surrounding the mobile device, and estimate the location of the mobile device with respect to the base stations. Because the geographic location of the multiple base stations is known, the determination of the location of the mobile device with respect to the base station provides the actual geographic location of the mobile device. The RF measurements of the transmitted signal at the base stations can include the time of arrival, the angle of arrival, the signal power, or the unique/repeatable radio propagation path derivable features (radio fingerprinting). In addition, the geolocation systems may also use collateral information, i.e., information other than that derived for the RF measurement to assist in the geolocation of the mobile device, such as location of roads, dead-reckoning, topography, map matching etc.

In a network-based geolocation system, the mobile device to be located is typically identified and radio channel assignments determined by (a) monitoring the control information transmitted on a radio channel for telephone calls being placed by the mobile device or on a wireline interface to detect calls of interest, i.e., 911, (b) a location request provided by a non-mobile device source, i.e., an enhanced services provider. Once a mobile device to be located has been identified and radio channel assignments determined, the location determining system is first tasked to determine the geolocation of the mobile device and then directed to report the determined position to the requesting entity or enhanced services provider. In addition to the RF measurements, other solutions exist for outdoor environments such as mobile device based A-GPS, AFLT, or network base TDOA, AOA, or various more.

However, repeaters and distributed antenna systems (DAS) further extend coverage into areas where the direct RF penetration from base stations is limited or insufficient. Those areas generally include tunnels, shadowed areas behind mountains, underground train systems, indoor areas, train coaches, ships, and many more. With the increasing use of mobile devices and more emergency calls initiated from a mobile network, accurately locating callers in these extended coverage areas is even more important. For the quick and precise guidance of emergency personnel or the police to the correct location, the exact coordinates of the individual that called 911/112 is important. However, contemporary RF and GPS solutions used in outdoor environments are insufficient to provide the needed location data for some of the extended coverage areas, especially inside buildings and other confined spaces.

Therefore, there is a need in the art for improvements in geolocation systems and methods of operation in a host wireless communication system that provides accurate geolocation of mobile devices served by both base stations and repeater stations.

SUMMARY OF THE INVENTION

Embodiments of the invention include a sensor in a sensor network. The sensor includes a controller and a RF receiver configured to receive RF signals. The RF receiver communicates with the controller. A global positioning receiver is configured to receive signals from a global positioning system and also communicate with the controller. A localization engine is configured to receive beacon signals transmitted by other sensors in the sensor network. The localization engine also communicates with the controller. The controller is configured to determine a position of the sensor using at least one of the RF receiver, global positioning receiver, and localization engine.

Embodiments of a sensor network include a location capture processing unit and a plurality of sensors in communication with the location capture processing unit. Each sensor of the plurality of sensors has a controller, a RF receiver configured to receive RF signals and communicate with the controller, a global positioning receiver configured to receive signals from a global positioning system and communicate with the controller, and a localization engine configured to receive beacon signals transmitted by other sensors in the sensor network and communicate with the controller. The controller of each of the plurality of sensors is configured to determine a position of its respective sensor using at least one of the RF receiver, global positioning receiver, and localization engine. The plurality of sensors communicates their position to the location capture processing unit.

In some embodiments, a distributed antenna system is provided. The distributed antenna system includes master unit, a location capture processing unit, a plurality of coverage antennas communicating with the master unit, and a plurality of sensors integrated in the plurality of coverage antennas and communicating with the location capture processing unit. Each sensor of the plurality of sensors includes a controller, a RF receiver configured to receive RF signals and communicate with the controller, a global positioning receiver configured to receive signals from a global positioning system and communicate with the controller, and a localization engine configured to receive beacon signals transmitted by other sensors in the sensor network and communicate with the controller. The controller of each of the plurality of sensors is configured to determine a position of its respective sensor using at least one of the RF receiver, global positioning receiver, and localization engine. The plurality of sensors communicate their position to the location capture processing unit.

BRIEF DESCRIPTION OF THE DRAWINGS

The accompanying drawings, which are incorporated in and constitute a part of this specification, illustrate embodiments of the invention and, together with a general description of the invention given above, and the detailed description given below, serve to explain the invention.

It should be understood that the appended drawings are not necessarily to scale, presenting a somewhat simplified representation of various features illustrative of the basic principles of the invention. The specific design features of the sequence of operations as disclosed herein, including, for example, specific dimensions, orientations, locations, and shapes of various illustrated components, will be determined in part by the particular intended application and use environment. Certain features of the illustrated embodiments have been enlarged or distorted relative to others to facilitate visualization and clear understanding. In particular, thin features may be thickened, for example, for clarity or illustration.

DETAILED DESCRIPTION OF THE INVENTION

Figure 1:
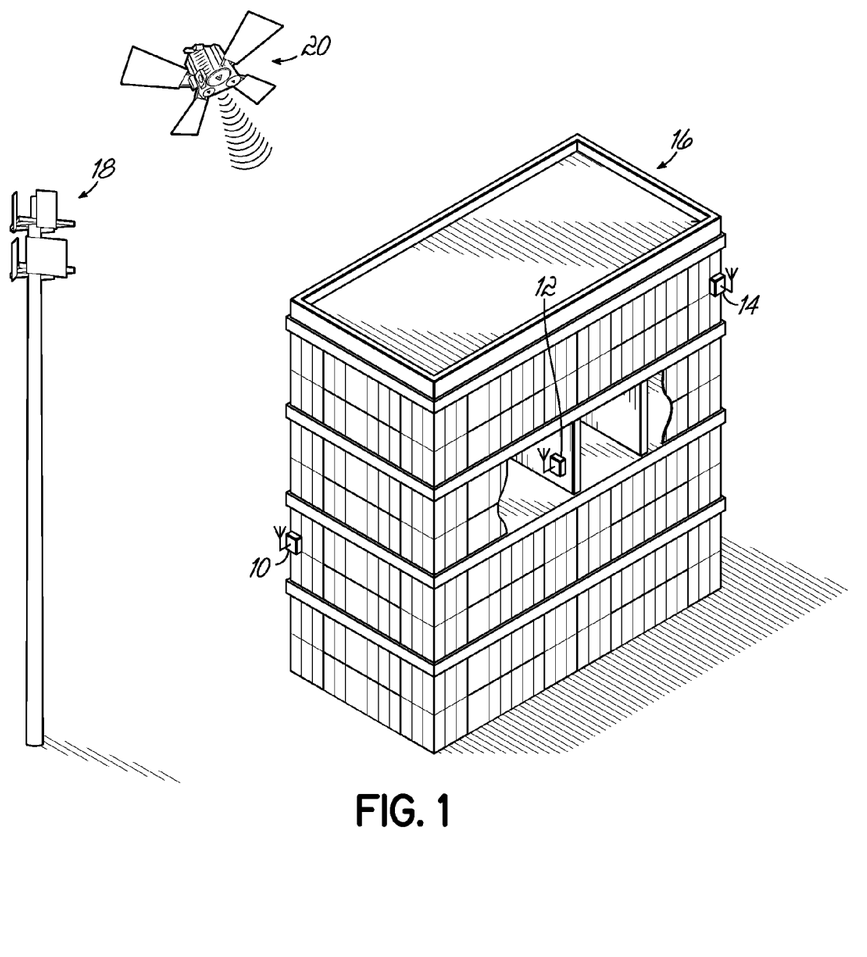
FIG. 1 illustrates an exemplary system with multiple sensors positioned in and around a building.

Existing outdoor solutions for the location of mobile devices cannot easily be used with the same accuracy in indoor or other confined areas and spaces. As illustrated in FIG. 1, location 10, 12, and 14 may be placed in and around a building 16 to expand the ability to locate a mobile device from base station 18. The location of the sensors 10 and 14 located either outside the building 16 or inside near a window may determine their location based on RF transmissions with a plurality of local base stations, such as the base station 18 (or a repeater) for example. Alternatively, the locations of location sensors 10 and 14 may be determined from GPS 20 signals. However, the location of sensor 12 may not be readily known as the RF signals from the base station 18 and/or signals from a GPS 20 may be blocked or shielded by building 16, inhibiting a direct path for providing location information even if the location of sensor 12 was known relative to the building 16. Furthermore, even if the sensor 12 were able to transmit its known location, if this sensor is moved to another part of the building 16, the location information of the sensor would need to be updated so that it does not transmit incorrect location information.

Figure 2:
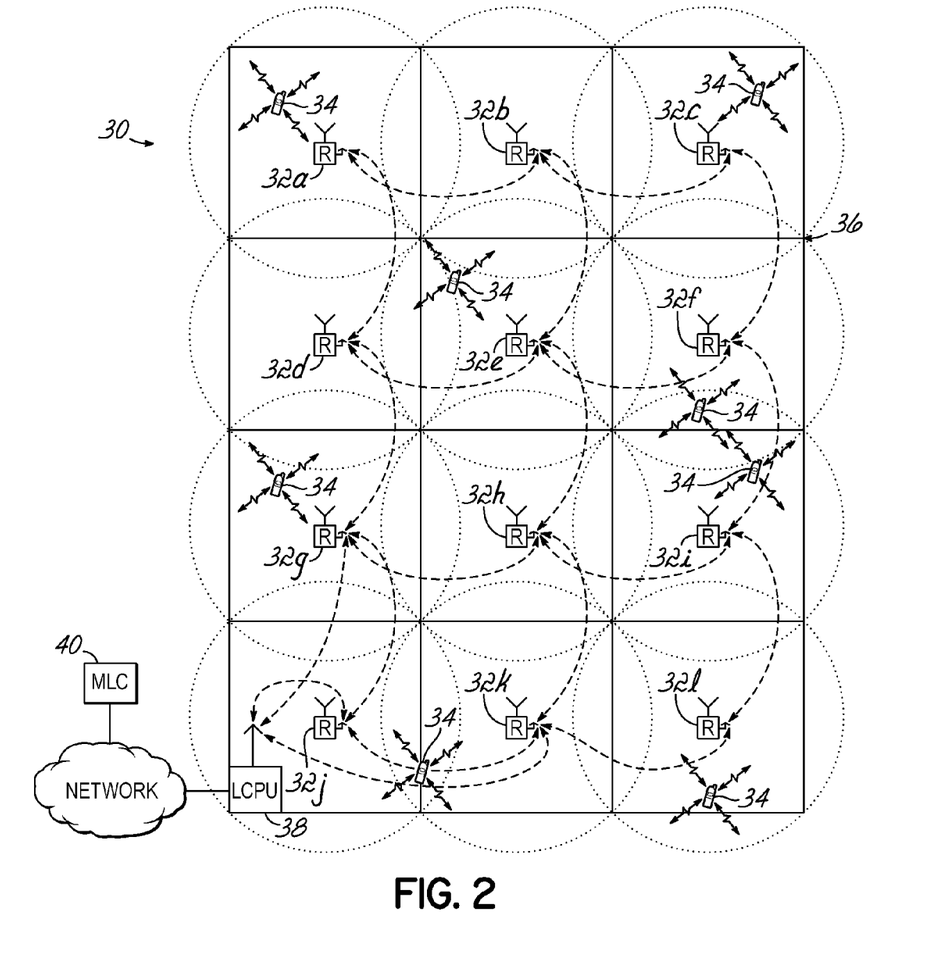
FIG. 2 is a diagram showing an exemplary sensor network.

To overcome these problems and referring to FIG. 2, embodiments of the invention provide a localization system 30 of distributed localization sensors 32a-32l, for example, shown in FIG. 2 that may assist in the accurate determination of a position of a mobile device 34 within a confined space 36, such as a building. The localization system 30 includes sensors 32a-32l configured to determine their own position as well as determine the proximity of a mobile device 34 to one or more sensors through the detection of RF energy. In some embodiments that sensors 32a-32l may be further configured to capture the actual RF signals digitally, process them, and then transmit the digital captures in a data reduced form with time stamp and sensor coordination information to a centralized location capture processing unit 38 (LCPU). The LCPU 38 may further process the captured RF by decoding it to determine if an actual mobile device 34 was present or an actual 911/112 call was placed. In other embodiments, other activities may trigger location based services, such as proximity detection for message or advertisement delivery, for example. These activities could be network triggered or could be triggered through the mobile device 34. The LCPU 38 may be configured to be connected to a mobile location server 40 or equivalent system that has the specific RF details of a voice call or data communication line, so that the frequency, time slots, encryption codes, and other required details to capture and decode the mobile connection are known to the sensor system 30 and the LCPU 38. This allows the LCPU 38 to determine or confirm the presence of a mobile device 34 in a specific location within the sensor network 30 area. Adding difference detectors to the sensors 32a-32l in one exemplary embodiment may allow the RF digital capture to be accompanied with additional information described further below. Should signals from the mobile device 34 be received by multiple sensors 32a-32l, an even finer resolution of the position of the mobile device 34 may be established through trilateration using RSSI differences, time differences of arrival or a combination of both. The synchronized captures of multiple sensors 32a-32l adjacent to the mobile device 34 may be used by the LCPU 38. An example of a mobile device position with the possibility of trilateration is shown in FIG. 2. The mobile device 34 is shown in one position in the overlapping zone of sensors 32b, 32d, and 32e. The dotted circle around the sensor depicts the area in which a mobile device can typically be detected. FIG. 2 additionally shows the mobile device 34 in another overlap zone where sensors 32f and 32i overlap. In order to use the RSSI of a mobile as an indicator of the distance from the sensor, in this example, the transmit power of the mobile needs to be known. If this parameter is controlled by the base station (as it is the case for most wireless communication standards such as GSM, CDMA, WCDMA, LTE, etc.) the RSSI level determined by the sensor should be used in a time synchronized comparison to the RSSI level of the same mobile originator determined at one or more neighboring sensors to ensure that the mobile is operating at the same power level for each RSSI level.

One aspect of the sensors 32a-32l used in embodiments of the sensor network 30 is the ability of the sensors 32a-32l to determine their own position without the interaction of the user or installer. In order to accomplish this, the sensors 32a-32l use multiple approaches to determine position. One of the possible approaches used by the sensors 32a-32l is the use of a GPS/GALILEO system receiver or other similar positioning systems receiver. To facilitate the sensors 32a-32l in determining their own position, a receiver for a GPS 20 (FIG. 1) or other positioning system receiver may be integrated into each of the sensors 32a-32l. For example a GPS system 20 is be designed to a receiver signal level of approximately −130 dBm for an outdoor environment. Most contemporary GPS receivers have a sensitivity to acquire a fix and thus a position of approximately −145 dBm with some newer receivers approaching approximately −150 dBm. In order to maintain a fix on the signal, the GPS receiver sensitivity may be even lower, for example at approximately −160 dBm. This represents an extra 25-30 dB margin to the outdoor signal level. This may also be enough margin for an indoor GPS receiver in a sensor to acquire its own position given the long amount of time provided. An assisted GPS server that communicates the current satellite positions in the vicinity to the sensor may also help to speed up the acquisition of a position. The assisted GPS server may be either integrated in the LCPU or may as well be an external server that is configured in the sensor's settings. The severe multipath environment that is usually found in confined spaces, however, will likely require a more sophisticated GPS receiver and decoding algorithm for sensors of the invention. Equalizers and/or multiple correlation or rake receiver type architectures may be utilized in the sensors' GPS receivers to assist in improving the GPS receiver sensitivity and position accuracy. Furthermore, the position can be averaged to improve the errors. Position measurements with large errors or large deviation from current position fixes to former can be dropped to improve the accuracy. In some embodiments, the sensors 32a-32l maintain their last known position in a memory so that after a power drop the sensor can start immediately without the need to go through a lengthy position acquisition period. The position will always be verified in case the sensor 32a-32l has been moved to a new location. A battery powered motion sensor may determine any movement as an indication of a change in the sensor's position while the unit was powered off.

Another feature of an embodiment of the invention for the sensors 32a-32l to determine their position is a sensor mesh network 30 where each sensor 32a-32l determines its relative position to its neighbors using propagation path loss measurements or propagation delay measurement of inter-sensor communication signals or sensor beacon signals transmitted at low RF power. For a sensor 32a-32l that is unable to acquire a strong enough GPS signal level, the relative position to adjacent nodes or sensors may be determined by the measurement of the RSSI level of the received beacon signals of adjacent nodes/sensors. Alternatively, the propagation time delay may be used, which requires a highly accurate common timing synchronization between the sensors/nodes 32a-32l in the sensor mesh network 30. The sensor 32a-32l in the mesh network 30 may either determine its absolute position by itself (if it has a unique solution) by trilaterating its position through the distance measurements to neighbor sensors with known positions. In another embodiment, the sensor may send its relative position measurements to a LCPU 38 and the LCPU 38 may then collect the information of one or more other sensors 32a-32l in order to compute the absolute position of a particular individual sensor 32a-32l, which positions it then communicates back to each sensor 32a-32l.

A somewhat similar network approach may be used by sensors that are, for example, near windows or building outer walls, where each sensor 32a-32l in a sensor network 30 has the ability to determine its position relative to a RF source outside of the sensor mesh network 30, such as a mobile base station or other transmitter stations. The sensor 32a-32l may be able to accomplish its location determination through detection and decoding of various beacon signals that are transmitted by one or more base transceiver stations (BTS) 18 (FIG. 1) in the area and through measuring the RSSI level and/or the time difference of arrival with respect to those BTS's. In some embodiments, the sensors are equipped with a wideband receiver, which is used to receive and decode the signals of the other radio sources, such as base transceiver stations of a mobile network. From a level measurement collected, an estimate of the distance to the common source may be performed. The location of the BTS 18 is known to the LCPU 38, and therefore the relative distance of the sensor 32a-32l to the BTS 18 may be used to determine the sensor's 32a-32l absolute position. Again, trilateration may be used similar to the approach discussed above with respect to a sensor determining its position with respect to its neighbor sensors. If the LCPU 38 has access to a cell site database the approximate position may be determined from the cells RSSI level and/or the time delay delta time difference of arrival between the cells.

In another embodiment, the position of a sub-set of sensors 32a-32l may be entered manually. All other 32a-32l may then learn their position through the approaches set forth above, by determining the relative position to the known position of the configured sensors. The manual entry of the absolute position of a subset of sensors 32a-32l may allow a system to work when either no GPS receivers are integrated into the sensors or no reception of GPS signals is available even for the sensors 32a-32l close to windows or outer walls that have the best line of sight to a GPS signal source.

Embodiments of the invention allow for the combining of one or more or all of the above approaches as well. When using the combined approaches, the sensors 32a-32l may use a position determined to have the least error or lowest standard deviation, or the sensors 32a-32l may determine an average position using the various position results with weights depending on the standard deviation of the position measurement.

A primary function of embodiments of the sensors 32a-32l is to be able to capture a wide frequency range suitable to receive the transmit signals of the mobile devices 34 in its proximity. The sensors 32a-32l have a preferably low cost receiver capable of detecting RF energy, capturing the signal, and reducing the data size of the captured signal through filtering and decimation. The sensor is either capable of processing the signal for decoding in the sensor 32a-32l itself or is configured for sending the signal to the LCPU 38 for processing-intensive decoding. In some embodiments, receivers in the sensors 32a-32l are tunable over the range of approximately 30 MHz to 3 GHz, as this would cover most of the active service frequencies. Some embodiments may be expanded to approximately 6 GHz, to also cover all WIFI bands. The sensitivity of the receiver must be adequate to still receive signals at a signal-to-noise ratio that is high enough to properly decode the signal without degradation. The capture receiver of the sensors 32a-32l is configured to receive uplink or reverse link signals from mobile devices and the downlink or forward link signals from base transceiver stations (BTS) 18 or other transmitter sources. Preferably, overall cost of the implementation is low as the sensors 32a-32l are placed at relatively low distances with respect to the mobile device 34 with adjacent sensors 32a-32l at short distances to assist in increasing the accuracy of the location of mobile devices 34. The instantaneous bandwidth of the receiver in the sensors 32a-32l may be as wide as the maximum bandwidth of the standards that are to be expected in the coverage area, i.e., Public safety 6.25 kHz-25 kHz, GSM 200 kHz, WCDMA 5 MHz, WiMax 20 MHz, LTE 20 MHz, and WIFI 20 MHz.

Figure 3:
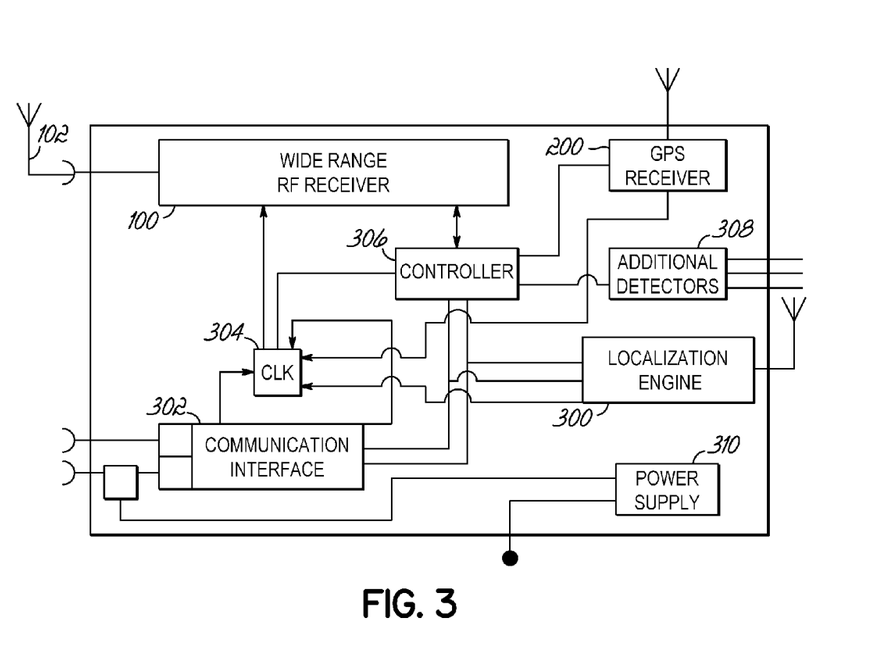
FIG. 3 is a block diagram of a sensor from the sensor network of FIG. 2.
Figure 4:
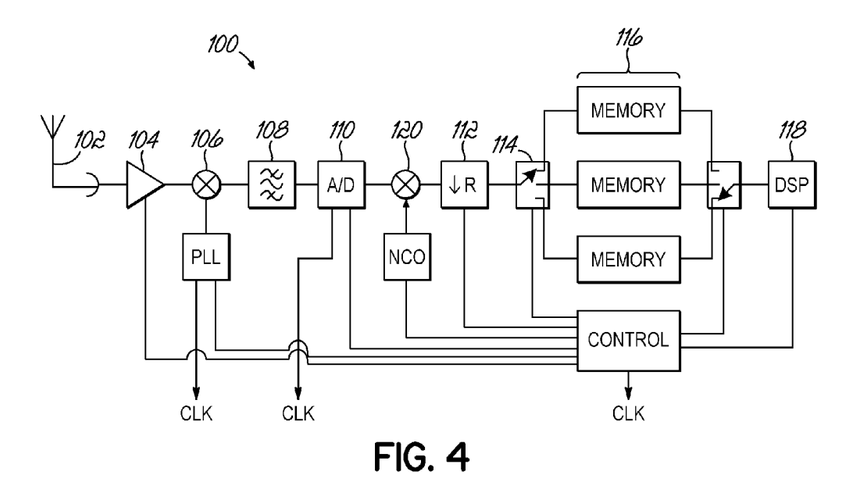
FIG. 4 is a detailed block diagram of a RF receiver in the sensor of FIG. 3

FIGS. 3-4 contain block diagrams of the RF sensors 32a-32l and components utilized by embodiments of the invention. The sensors 32a-32l may include any or all of the following core elements. The sensors 32a-32l include a wide range RF receiver 100 with up to 22 MHz instantaneous bandwidth. Alternative embodiments may use even higher instantaneous bandwidths (for example, WIFI IEEE802.11n: 40 MHz, LTE Advanced: 100 MHz). The receiver 100, as seen in the block diagram in FIG. 4, includes an antenna 102 to receive the RF signals from mobile devices. A first amplifier is coupled to the antenna 102. A mixer 106 is utilized to convert the band of interest to an appropriate intermediate frequency (IF), or in case of a quadrature mixer used, the RF signal can be converted to a complex output (in-phase and quadrature components) at an intermediate frequency (IF) or directly down to the base band. A filter 108 is then used to select only a specific portion of the converted frequency band and to help anti-aliasing. The combination of circuits 104, 106, and 108 represent the RF front-end of the receiver. Analog-to-digital converter 110 samples the analog spectrum and generates a digital representation of the signal. A circuit 112 to apply digital filtering and signal conditioning as well as decimation may be employed to reduce the sample rate to an appropriate sample rate required for the signal of interest. Optionally, a digital mixer 120 between the ND converter 110 and circuit 112 converts the signal in frequency to allow the selection of specific spectral components out of the digitized RF spectrum. Digital switch 114 allows the digital samples to be stored into a capture memory section of capture memory banks 116. Digital signal processor 118 may then be used to further process the signal captures for further data reduction and possible decoding of the signals. The combination of circuits 112, 120, 114, 116, and 118 represent the digital back-end of the receiver. Optionally, a plurality of digital receiver back-ends consisting of circuits 112, 120, 114, 116, and 118 may be coupled to the output of the ND converter 110. This would allow the indepent reception of wide-band spectra as well as narrow-band spectra. In practical implementation the circuits 112, 120, 114, 116, and 118 can be candidates to be integrated in a field programmable gate array (FPGA) or application specific integrated circuit (ASIC).

Figure 5:
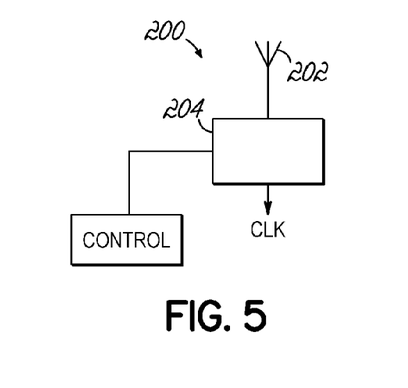
FIG. 5 is a detailed block diagram of a GPS receiver in the sensor of FIG. 3

Embodiments of the sensors may also include a GPS and/or Galileo positioning system receiver 200, as detailed in FIG. 5. The receiver may include an antenna 202 that is attached to a sensor 204 in such a way as to maximize the reception of GPS or Galileo signals and minimize the interference from its own electronics. Other positioning system receivers for other global positioning systems may also be used as well.

Embodiments of the sensors also further include a localization engine 300 that may also support the GPS/Galileo position receiver 200 in case of weak signals. That localization engine 300 transmits a beacon signal via RF and measures the RSSI signal strength and/or signal delay from its surrounding sensors. With a known signal strength of the transmitter and an established propagation constant for the confined environment, the localization engine 300 may determine the distance to the various surrounding sensors 32a-32l that it receives signals from. Path loss is usually expressed in dB. In its simplest form, the path loss can be calculated using the formula:

$$L = 10n \log_{10}(d) + C \tag{1}$$

where L is the path loss in decibels, n is the path loss exponent or propagation constant, d is the distance between the transmitter and the receiver, usually measured in meters, and C is a constant which accounts for system losses. Similarly, the propagation delay or differential delays may be used as the mechanism to determine the distance to the adjacent sensors 32a-32l in a synchronized sensor network. The sensor 32a-32l should at least receive the beacons of three or more adjacent sensors 32a-32l and therefrom, the sensor 32a-32l may determine its own relative position to its adjacent sensors 32a-32l though trilateration. If two of the adjacent sensors 32a-32l know their absolute position, either through the GPS system or through trilateration, the sensor 32a-32l may then be able to determine its own absolute position. Eventually all sensors 32a-32l should be able to determine their own position in the confined area. In an alternative embodiment, the centralized LCPU 38 receives all beacon RSSI or delay measurement results for the various sensors 32a-32l and computes the absolute location of the specific individual sensor 32a-32l, which it then communicates back to the sensor 32a-32l with regular updates. In one embodiment, the transceiver of the localization engine 300 is used for inter-sensor communication, as well as for the sensor communication to the LCPU 38. For example, ZigBee radio components might be used for that specific purpose.

In another embodiment, a communication interface 302 may also be utilized to allow the sensor 32a-32l to communicate with other sensors 32a-32l or the LCPU 38. The communication may be wired using cable (twisted pair cable such as CAT5e or CAT6a, coaxial cable such as RG6, optical fiber such as single mode or multi-mode fiber or plastic fiber, or other types of cables) or wireless (ZigBee or another suitable standard). An on-board clock 304 is used to provide clock signals to all the components in the sensor 32a-32l. The clock 304 may be synchronized via the communication interface 302, via the localization engine 300, or via the GPS/Galileo receiver 200. Alternatively, an outside signal from an adjacent base station 18 may be captured with the capturing receiver 100 and used to synchronize the sensor 32a-32l with a central clock. A controller may select which source is used to synchronize the clock 304. Additional detectors 308 may be added to the sensor 32a-32l to expand its capabilities, as discussed below.

The sensors may also include an internal power supply 310 that supplies all the components with the required power. An input to the power supply may either be a local input or alternatively may be remotely supplied via a wired communication infrastructure. Alternative power sources such as solar cells can be used to provide the minimum power of the sensor at perhaps reduced functionality. An integrated chargeable battery may be used as a backup for limited time periods of power failures. Controller 306 is the central control element for each sensor 32a-32l. Controller 306 controls the wide range capture receiver 100, receives position data and controls the GPS receiver 200, controls and receives measurements from the localization engine 300, and uses the communication interface 302 to communicate with the LCPU 38 as well as possible communications with other sensors 32a-32l. The controller 306 may keep an absolute timing reference to allow for a synchronized capture on different sensors 32a-32l. The absolute timing may be acquired through the GPS receiver 200, the capture from adjacent base stations 18, or the communication link in the communicate interface 302.

Communication between the sensors 32a-32l may be established using multiple approaches. The sensors 32a-32l may communicate via wired connections or through a wireless mesh network structure. One possible standard that allows the mesh network to communicate is the ZigBee standard. The standard was designed to supply multi-hop "Wireless Sensor Network" (WSN) architecture. The maximum bit rate is 250 kb/s and the transmit power is limited to 0 dBm. Therefore the maximum distance between the sensors 32a-32l is limited to approximately 10-75 m (approximately 33-236 ft). The wireless transmission may be encrypted as well. ZigBee radio components may allow both the communication between sensors 32a-32l as well as the self-localization of the sensors 32a-32l using built-in localization engines 300. Encryption for the sensor communication may assist in preventing intruders from modifying data that is sent and received.

Figure 6:
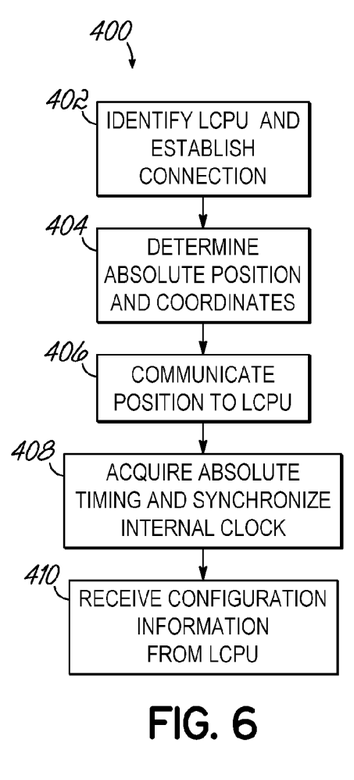
FIG. 6 is a flowchart of a start up process for the sensor network of FIG. 2.

After installation and switching the sensors on for the first time, the sensors perform a start up process. FIG. 6 contains a flowchart 400 of this process. The communication link is started. The LCPU address is identified and a connection is established with it (block 402). If the sensor communication is using a RF mesh network link, each sensor may be configured as a router. The sensor then determines its absolute position and coordinates (block 404). In some embodiments, this may occur in stages. For example, as a first stage, the sensor, if equipped with a GPS receiver, may try to locate GPS signals to determine its position. If the sensor does not have a GPS receiver, or if GPS signals are unavailable, then at a second stage, the sensor may communicate with other sensors to obtain its relative position to those sensors. From this relative position, the sensor can then determine its absolute position and coordinates. The position information is communicated to the LCPU (block 406). An absolute timing is acquired and the sensor's internal clock is synchronized to the system clock as determined by the LCPU (block 408). The LCPU may then configure all sensors to either wait for a specific capture command and/or set a threshold-based trigger for a set of bands (block 410). In case of the threshold-based trigger the capture receiver may actively scan the bands for a strong signal. The LCPU performs a scan of received base stations and decodes their unique identity also called Cell Global Identity (CGI). The CGI for a GSM network, for example, consists of the Mobile Country Code (MCC), the Mobile Network Code (MNC), the Location Area Identifier (LAI), and the Cell Identity (CI). The LCPU identifies all the different CGIs it is able to detect, sorts them according to the different network operators, and registers the CGIs of one operator at the MLC or GCS (Geolocation Control System) of the equivalent operator. For example, on one embodiment, the LCPU is configured with the address of the MLC for one operator. After the initial configuration LCPU auto-registers at the MLC of one operator and in that registration includes the detected CGIs of the network of that operator. Either an open standard protocol could be used or a proprietary protocol. Embodiments using auto-registration of the LCPU should include:

a. Location of the LCPU as physical street address as well as the latitude and longitude.
 b. Manufacturer and product details, such as what protocols and standards are supported.
 c. Details on the location request queue, which is a list that contains the location requests the LCPU needs to process.
 d. Status information such as alarms, events, hardware and software configuration and revisions, for the presence as well as the past.
 e. Authentication and encryption public key to allow the authentication of a LCPU and to protect the MLC-LCPU connection from being interfered with or otherwise accessed.

The location request received by the LCPU contains all required information to locate and follow the uplink signals of the mobile in question. The LCPU adds a new task to the task stack which will be processed in the sequence of reception. Once a task is ready to be activated it tasks the sensors to take captures for the specific UL channels and either lets the sensors decode the signal captures or processes the captures after having received them from the sensors. Depending on the standard a detection of the downlink signals might be required to acquire time synchronization to the base station either directly before the uplink signals are captured and analyzed or as an ongoing process after the first decoding and registration of the CGIs. The location response can contain information on whether or not the mobile was detected, the LCPU position and the more precise position derived from the mobile's proximity to the sensor or sensors such as more precise latitude and longitude and height, or in building or confined space terms (building area, floor number, room or hall number, row or section of stadium or theatre, etc.).

Figure 7:
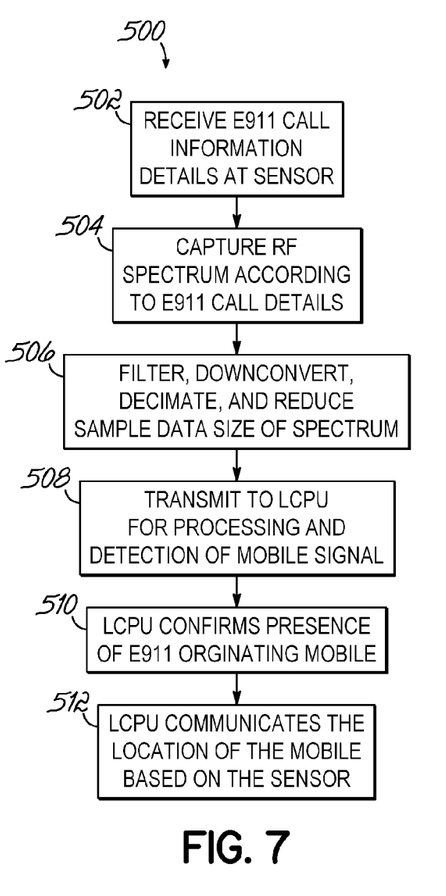
FIG. 7 is a flowchart of the operation of the sensors in the sensor network of FIG. 2.
Figure 8:
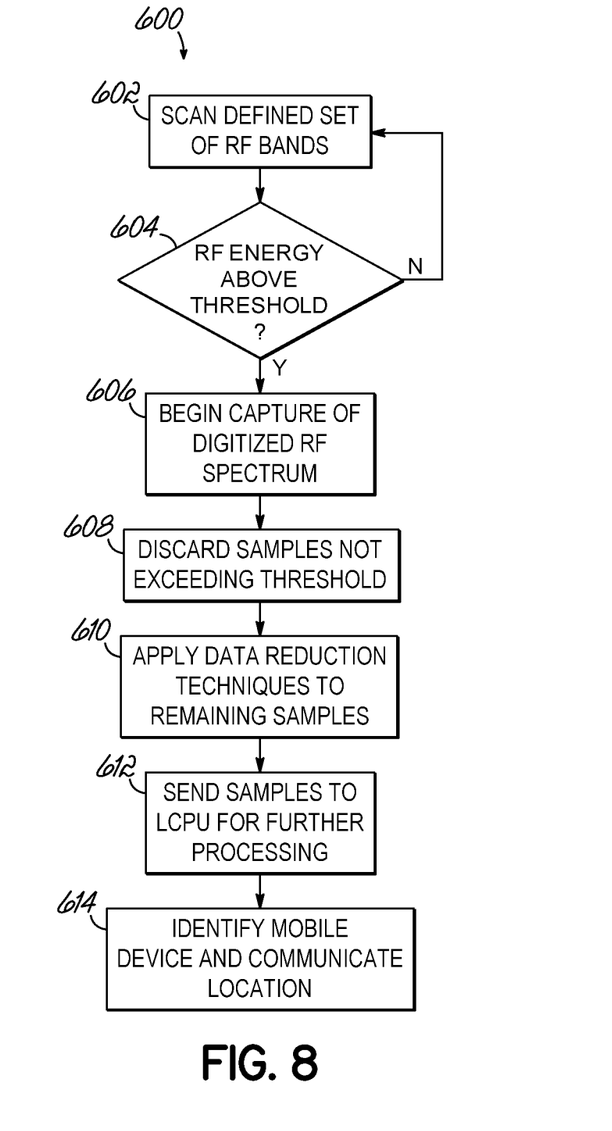
FIG. 8 is a flowchart showing an alternate operation of the sensors in the sensor network of FIG. 2.

During operation and as seen in flowchart 500 in FIG. 7, the sensor network may perform the following. A mobile location center (MLC) or other system may send E911 call information details. This information may include all of the information required to find an active E911 call and properly decode and decrypt the call to confirm the presence of the mobile device in the area of a sensor (block 502). In other embodiments, events triggering the sensor's operation may include a location based service geo-locate request, a mobile phone user application location request, or a signal above a threshold. The mobile phone user application may be a Google Mobile application that requests for the presence of a DAS or repeater system in order to be more exact in the determination of the mobile's position in applications running on the mobile equipment. The capture receiver of the sensor will then capture the RF spectrum according to the information provided (block 504). Either the sensor starts to decode the signal in order to identify the presence of the call, or it just filters, down converts, decimates and further reduces the sample data size to no less than one sample per symbol of the mobile communication standard (block 506) in order to send it to the LCPU for further processing and detection of the mobile signal in question (block 508). The sensor might discard samples that do not exceed a predefined threshold as the low signal level might indicate that no mobile signal is present between periods of transmission. Each time a gap is introduced due to the discard of samples a time stamp has to be introduced at the beginning of the next continuous block of samples to allow the properly timed decoding of the uplink signals. The LCPU receives the capture data and processes it to decode and confirm the presence of the E911 originating mobile (block 510). The LCPU then communicates to the E911 center (MLC or other system) the location of the mobile device (block 512). Alternately, and as shown in flowchart 600 in FIG. 8, the sensor may operate using a RSSI-based trigger mechanism. The capturing receiver in each sensor will scan a defined set of RF bands (block 602) and identify RF energy above a configured threshold (block 604). Ideally a fast scanning mechanism is implemented to avoid missing the presence of a signal of a mobile device. If no mobile device is detected ("No" branch of decision block 604), the sensor continues to scan in block 602. Once the transmission of the mobile device is detected ("Yes" branch of decision block 604), the capturing receiver will start the capture of digitized RF spectrum and remain in the frequency long enough to wait and capture further signals (block 606). Out of the captured data only the samples exceeding the predefined threshold will be kept (block 608) and further processed applying data reduction techniques (block 610). In case of a hopping GSM signal, the capture needs to span over the entire RF band where the hopping channels are expected. The data is then either kept for a while as a preemptive mechanism for a possible E911 call or sent to the LCPU for further processing and decoding of the singles to positively identify a specific mobile (block 612) and communicate the location of the mobile device. The results are then sent to the upper layer system for E911 location service or location-based configuration (block 614). The LCPU may use the collected data as well to determine traffic within the confined area. The scanning mechanism may employ one of a number of methods. For example, a very fast but coarse method is to monitor the various bits of the ND converter. If a higher significant bit is triggered at the output of the ND converter a higher signal level is expected in somewhere the entire digitized RF band. Another method would be the implementation of a RMS power $P_{RMS}$ detection by using the square of digitized signal $V_{RMS}(t)$ to obtain the RF RMS power of the digitized RF signal as given by the equation below:

$$P_{RMS} = \frac{V_{RMS}^2(t)}{R}$$
$$= \frac{1}{R} \cdot \frac{1}{n} \sum_n x^2(t)$$

The parameter n defines the length of the digitized capture the RMS power is calculated over. R is the input impedance of the ND converter 110. Still another way to implement the scanner mechanism over a smaller bandwidth than the entire digitized spectrum is to use a back-end of the digital receiver (blocks 112, 120, 114, 116, and 118 of FIG. 4). Several parallel back-end receiver scanner mechanisms may allow for monitoring of several signals in parallel.

Figure 9:
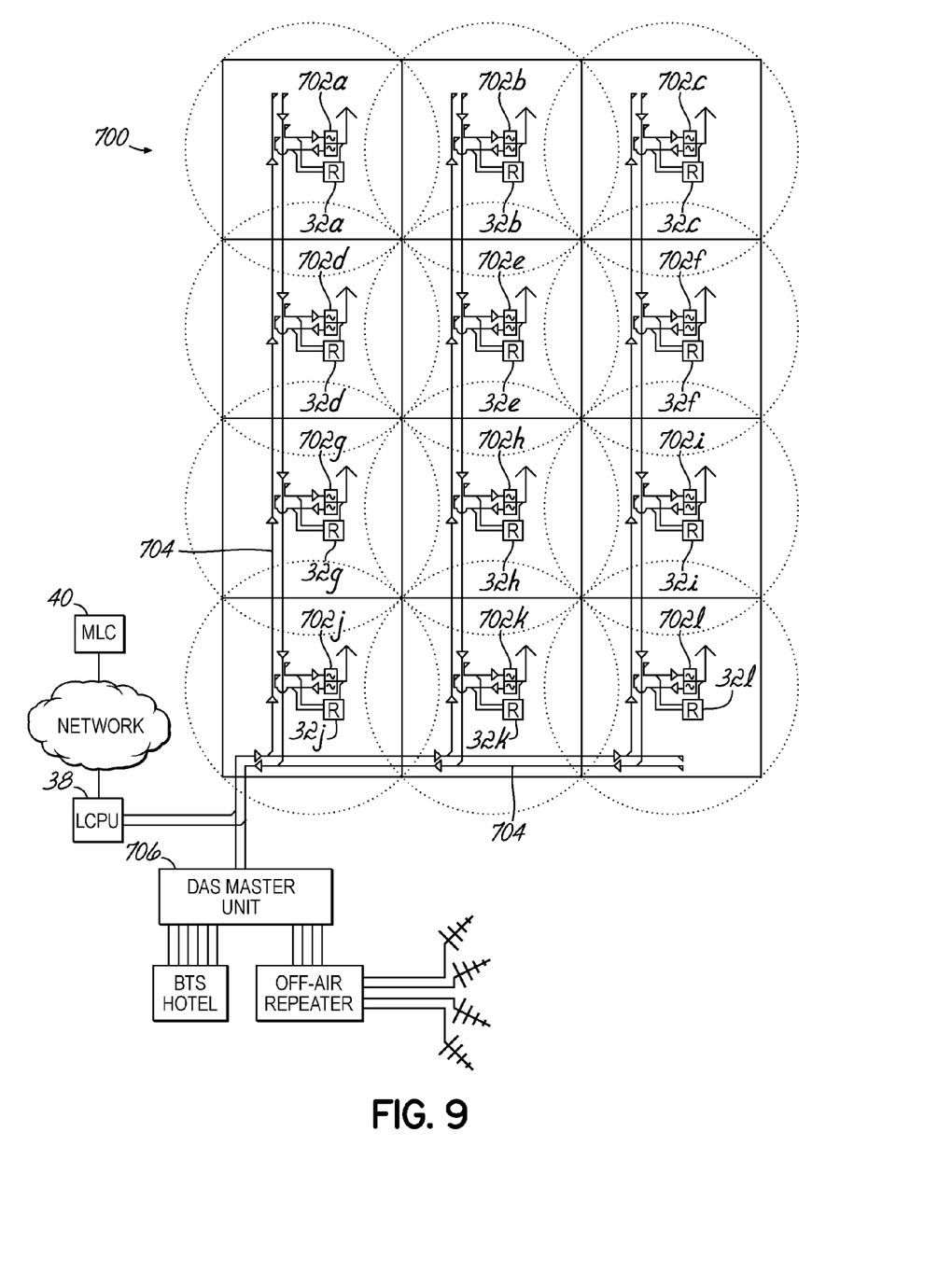
FIG. 9 is an alternate embodiment of the sensor network integrated with a distributed antenna system.

In an alternate embodiment, the sensor network may be combined with a distributed antenna system (DAS). This can be a DAS system with active coverage antennas which have amplifiers in both downlink and uplink direction to compensate for the distribution losses. The distribution of the signals can be as analog signals or over a digital signal flow. The DAS system could as well be a passive distribution system with a active high power driver at the head end and only passive components such as RF cable, RF splitters and combiners, and antennas. FIG. 9 illustrates one possible integration strategy of the sensor network in the distributed antenna system (DAS) 700. In the illustrated example, a sensor 32a-32l is integrated into each coverage antenna 702a-702l. This would allow the sensor 32a-32l the benefit from the available power at the DAS point as well as the possibility to use the feeding cable 704 for communication with the LCPU 38. In addition to the sensors at the coverage antennas there is the option to have one sensors at the master or at the LCPU itself. The LCPU could task that sensor with the steps to capture and decode the mobile signals. If the mobile is detected at this point a first response could be send back to the location requestor. In the next step the distributed sensor could be tasked with capture and detect request in order to allow a more finer location response from the sensors closer to the actual position of the mobile. In another implementation form the sensors can be combined with a macro or micro repeater. Here only one sensor is coupled to each coverage antenna. The LCPU can be either integrated in the repeater as well or there can be an external and remote LCPU. In those cases of only one sensor without the plurality of multiple sensors the location engine might not be required or deactivated.

In an alternate embodiment, the sensor network may be integrated within a distributed antenna system (DAS) or an element of a DAS system such as the master unit or the remote unit or an intermediate unit in between the master and remote unit. The level of integration may be a mechanical integration or a complete integration. In the complete integration the sensor may use existing blocks of the DAS remote or master unit. Examples of different embodiments having a complete integration with an analog DAS system may include:
1. The re-use of the antenna (equivalent to block 102, FIG. 4).
2. The antenna and the duplexer (equivalent to block 102 followed by a filter (not shown), FIG. 4).
3. The antenna, the duplexer, and the full front-end (equivalent to blocks 102, 104, 106, and 108, FIG. 4).
4. The controller, clock and power supply (equivalent to blocks 306, 304, and 310, FIG. 3).
5. The controller, clock, power supply, and communication interface (equivalent to blocks 306, 304, 310, and 302, FIG. 3).
6. A combination of 4 above with 1, 2, or 3 above.
7. A combination of 5 above with 1, 2, or 3 above.

The sensor may use existing components of the DAS system as listed in configurations 1 to 7 above. For example, in an integration with a DAS system incorporating a digital signal processing unit (digital DAS), additional elements present in the digital DAS system may be used for the sensor, so that the wide range receiver 100 may already be implemented as the front-end of the digital DAS system and only the parts 120, 112, 114, and 116 would need to be added to the already present hardware. As the implementation of the digital DAS system may incorporate a FPGA for the digital signal processing, the addition of the sensor to the FPGA may only require a firmware and/or software update. Elements 200, 308, and 300 (FIG. 3) would still be needed as additional hardware to the digital DAS system.

In an alternate embodiment, the sensor network may also have a signal generation scheme implemented to transmit a beacon signal at a low power level. The beacon would be modulated according to the mobile network standard and carry the required information to be identified as a neighbor base station by the mobile devices. The frequency or scramble code would need to be included in a neighbor cell list of the serving BTS. As the mobile device performs the neighbor cell scan it may discover the pseudo cell and report it back to the network. This may enable the network to offer location-based services to that specific mobile device as it was detected in the proximity of a confined area. To save the implementation costs on a sensor for each band and network operator, the beacon may be configured to change frequency and modulation in order to serve each operators network only for a limited time. This may be sufficient for the low mobility confined area to report the pseudo cell to the network. This time slicing of the beacons may assist in limiting the implementation costs. In embodiment of the sensor network being integrated with a DAS system, the pseudo cell may be centrally generated at the master unit 706 (FIG. 9) and then distributed via the DAS system 700.

The installation of the sensor can be facilitated through indicators on the sensor unit (examples may include colored LEDs, acoustic noise, screen message or indicator, etc.). The indicators are set by the controller 306 and can show whether enough neighboring beacon cells are received, a GPS signal is received or a position fix is acquired. The indicator can as well show the number of neighboring beacons received. This information allows easier position finding during installation. The battery back-up option will allow the sensor to be powered when moved around for the installation purpose.

Embodiments of the invention may also be used to detect an active mobile device in an area where at times no active device is allowed, such as in an airplane after closing the doors or in other restricted areas such as hospital Emergency rooms, United States Immigration and Customs areas, etc. Alternatively, embodiments of the sensor network may be equipped with other detectors to enhance its function. For example, detectors for heat or temperature may be included to detect fire, or depending on the sensitivity of the detector, for detecting the presence of a human being. Movement detectors may be employed to detect humans, animals, or vehicles in the confined space. Acoustic noise detectors may be used to detect screams, loud crash noises, or other noise. Fire, smoke, and/or gas detectors may be used combining the sensor network with the fire detection and alarming system. A microphone may be incorporated to capture audio in case of emergencies. Wide angle video cameras may be incorporated to take snap shots, which would be sent with the RF capture or function as closed circuit TV camera. Speakers may allow for coupling to a paging system and possible communicate with victims in the building. Additionally, the sensor network may be connected to the building alarming system, especially in cases where these additional detectors are integrated into the sensor.

The additional detectors also allow the sensor network to be tied into a security system of a building or confined area space. For example, the sensor network with additional fire detectors may be coupled into a security system of a house. In addition to the detection of fire, the presence of a mobile device might indicate the presence of a person. 911/112 calls placed outside of the structure under fire may also be located allowing the emergency services personnel to be more focused in the search of the individual in question. Alternatively, detection of a mobile device without the presence of a human as expected may be used in situations for locating or identifying independent explosive devices (IED).

Furthermore, embodiments of the sensor network may be coupled and/or combined with an IT installation of a structure. In one embodiment, the active device may be integrated into a telecom outlet interface plate, which is typically present in offices, meeting spaces, or hallways. The antenna for the RF capture receiver receiving signals of the mobile devices may be incorporated into the face plate of the outlet. Detectors for the presence of IT or telecom connectors could be integrated to allow signaling an active connection to the IT system. In addition, the sensor network may assist in locating specific outlet interfaces without the need to manually enter locations into a management system. As a further advantage in some embodiments, the wired IT infrastructure may be used to communicate and send the RF capture data to the LCPU. Integrating with a telecom outlet may also be beneficial from a power point of view. These outlets are generally located close to power outlets so the sensor could be easily powered. In alternative embodiments, the sensors may be mounted into the ceiling or a ceiling tile or behind a ceiling tile in the upper duct to be invisible. Directional antennas may also to limit the RF capture to a specific area or floor. Although, a typical indoor environment may not allow high directivity as objects close to the antenna and multipath environments typically deform antenna patterns.

While the present invention has been illustrated by a description of one or more embodiments thereof and while these embodiments have been described in considerable detail, they are not intended to restrict or in any way limit the scope of the appended claims to such detail. Additional advantages and modifications will readily appear to those skilled in the art. The invention in its broader aspects is therefore not limited to the specific details, representative apparatus and method, and illustrative examples shown and described. Accordingly, departures may be made from such details without departing from the scope of the general inventive concept.

What is claimed is:

1. A distributed antenna system, comprising:
a master unit;
a plurality of remote units in communication with the master unit; and
a plurality of sensors associated with respective remote units;
the sensors including receiver circuitry configured for capturing RF signals from mobile devices and including a controller;
the sensors configured for using the RF signals from at least one mobile device captured by the receiver circuitry and determining position information for the at least one mobile device in the distributed antenna system;
the receiver circuitry of a sensor including an RF receiver integrated with a respective remote unit and operable to receive RF signals from mobile devices for providing RF communications in the distributed antenna system.

2. The distributed antenna system of claim 1 further comprising a processing unit coupled with the remote units, the processing unit coupled to receive the position information and further processing the position information to determine the position of the at least one mobile device in the distributed antenna system.

3. The distributed antenna system of claim 2 wherein the processing unit is coupled with the remote units to receive the position information for the at least one mobile device determined by a plurality of sensors and further processing the position information from the plurality of sensors to determine the position of the at least one mobile device in the distributed antenna system.

4. The distributed antenna system of claim 1 wherein the receiver circuitry is in communication with the controller.

5. The distributed antenna system of claim 1 wherein the sensor is configured for evaluating information of the captured RF signals including at least one of received signal strength (RSSI) information or time difference of arrival information.

6. The distributed antenna system of claim 1 wherein the receiver circuitry of a sensor is triggered for capturing RF signals from a mobile device based on at least one of the following triggering events: a location based service request, a location request of a mobile device or a signal received by the sensor being above a threshold.

7. The distributed antenna system of claim 1 wherein the position information for a mobile device includes information regarding at least one of: latitude, longitude, height, an area of a building, a floor of a building, a room of a building, a hall of a building, a row of a building or a section of a building.

8. The distributed antenna system of claim 1, wherein the sensors are configured for receiving signals and determining position information for the respective sensors.

9. The distributed antenna system of claim 8, wherein the position information for the sensors includes absolute positions for the sensors.

10. The distributed antenna system of claim 8, wherein the position information for the sensors includes position information that is relative to another sensor.

11. The distributed antenna system of claim 1, wherein the processing unit includes a location capture processing unit for further processing the position.

12. The distributed antenna system of claim 11, wherein the location capture processing unit is further configured for being in communication with a mobile location center.

13. The distributed antenna system of claim 11, wherein the location capture processing unit is further configured for processing information from at least one base station and for determining the identity of the at least one base station.

14. The distributed antenna system of claim 11, wherein the location capture processing unit is further configured for processing information from at least one base station and determining the identity of the at least one base station, the location capture processing unit further configured for using position information received by a sensor and the information from the base station to determine the position of the at least one mobile device.

15. The distributed antenna system of claim 11 wherein the location capture processing unit is further configured for being in communication with a building security system.

16. The distributed antenna system of claim 1, wherein at least one of the sensors further includes a detector selected from the group consisting of: a temperature detector, a movement detector, an acoustic noise detector, a fire detector, a smoke detector, a gas detector, and combinations thereof.

17. The distributed antenna system of claim 1, wherein at least one of the sensors further includes a device selected from the group consisting of: a microphone, a wide angle video camera, a speaker, and combinations thereof.

18. The distributed antenna system of claim 1 further configured to use trilateration of signals captured by the receiver circuitry of a plurality of sensors to determine position information for the at least one mobile device.

* * * * *